May 22, 1928. 1,670,512
A. KORONSKI ET AL
MACHINE FOR CALCULATING MOMENTS OF INERTIA
Filed Nov. 27, 1920 3 Sheets-Sheet 1

JOINT INVENTORS
André Koronski
Ralph H. Heacock

May 22, 1928. 1,670,512
A. KORONSKI ET AL
MACHINE FOR CALCULATING MOMENTS OF INERTIA
Filed Nov. 27, 1920 3 Sheets-Sheet 2

JOINT INVENTORS
André Koronski
Ralph H. Leacock

May 22, 1928.

A. KORONSKI ET AL 1,670,512

MACHINE FOR CALCULATING MOMENTS OF INERTIA

Filed Nov. 27, 1920     3 Sheets-Sheet 3

JOINT INVENTORS
André Koronski
Ralph H. Leacock

Patented May 22, 1928.

UNITED STATES PATENT OFFICE.

ANDRÉ KORONSKI, OF NARBERTH, AND RALPH H. HEACOCK, OF SWARTHMORE, PENNSYLVANIA; SAID ANDRÉ KORONSKI NOW BY JUDICIAL CHANGE OF NAME ANDREW KING.

MACHINE FOR CALCULATING MOMENTS OF INERTIA.

Application filed November 27, 1920. Serial No. 426,791.

Our invention relates to machines for calculating moments of inertia graphically and by means of this machine the calculator can see almost at a glance the effect on the moment of inertia of any change in shape of the area being calculated and the moment of inertia of irregular shapes can be determined quickly and with greater accuracy than is now possible except by very laborious methods.

For educational purposes this machine has the advantage that it presents the moment of inertia graphically in such a way that its relation to the area of which the moment of inertia is being calculated can be clearly seen, thus enabling the student to grasp this relation more readily, a thing which is very difficult to do without such help.

The objects of this invention are to provide a simple means of obtaining moments of inertia mechanically and also to make a graphical representation of them.

We attain these objects by means of the construction described in the annexed specification and shown in the accompanying drawings and in which.

Figure 1:
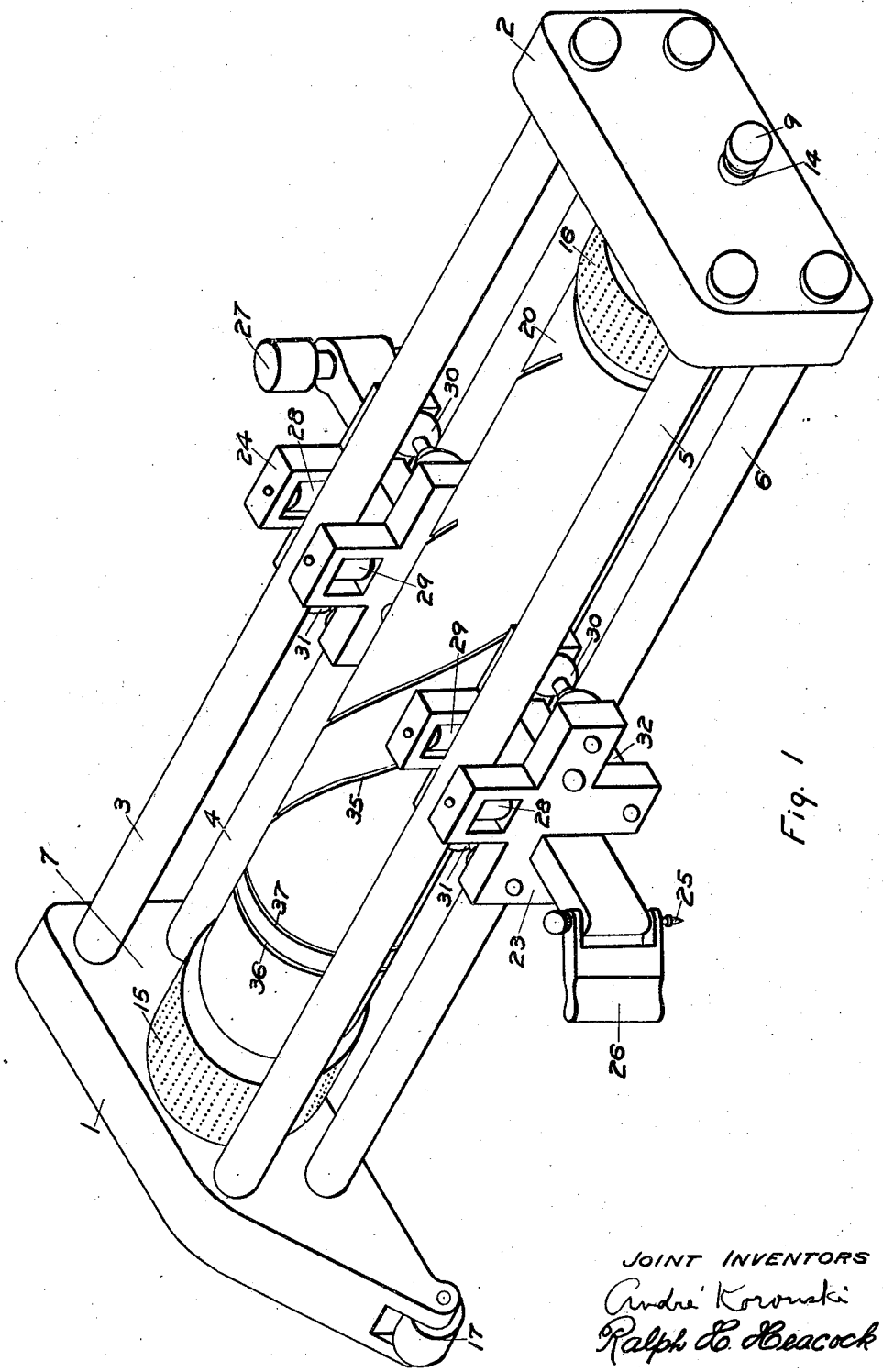
Fig. 1 is an isometric view of the device.
Figure 2:
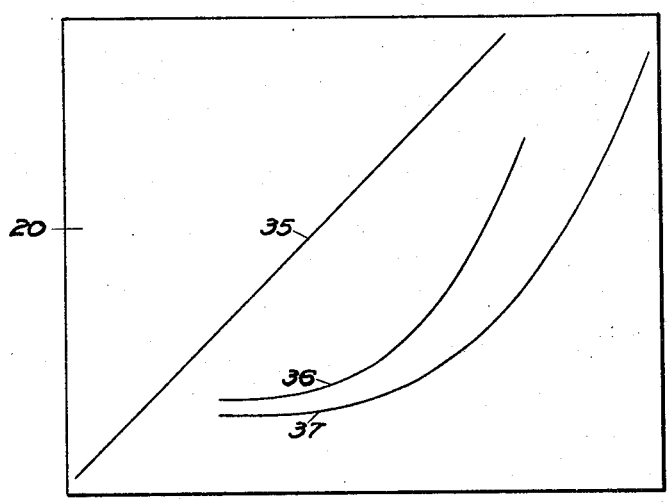
Fig. 2 shows the surface of the drum 20 developed.
Figure 3:
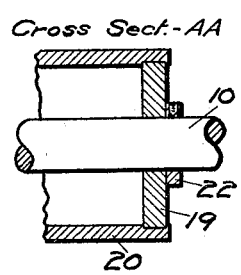
Fig. 3 is a section thru the end of the drum 20 showing how it is pivoted on the axle 10.
Figure 6:
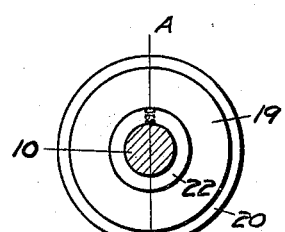
Fig. 6 is an end view of Fig. 3.
Figure 4:
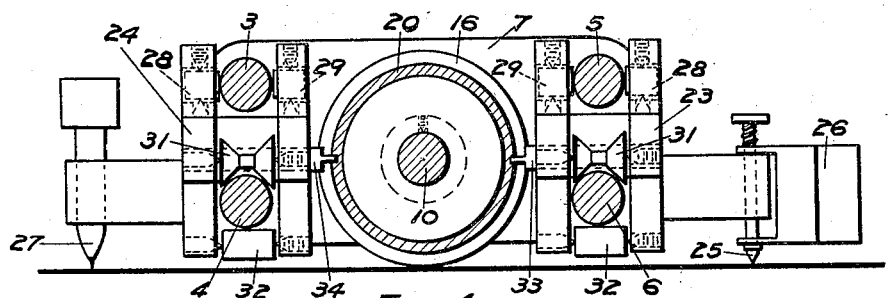
Fig. 4 is a transverse section thru the machine showing the relative position of the various parts.
Figure 5:
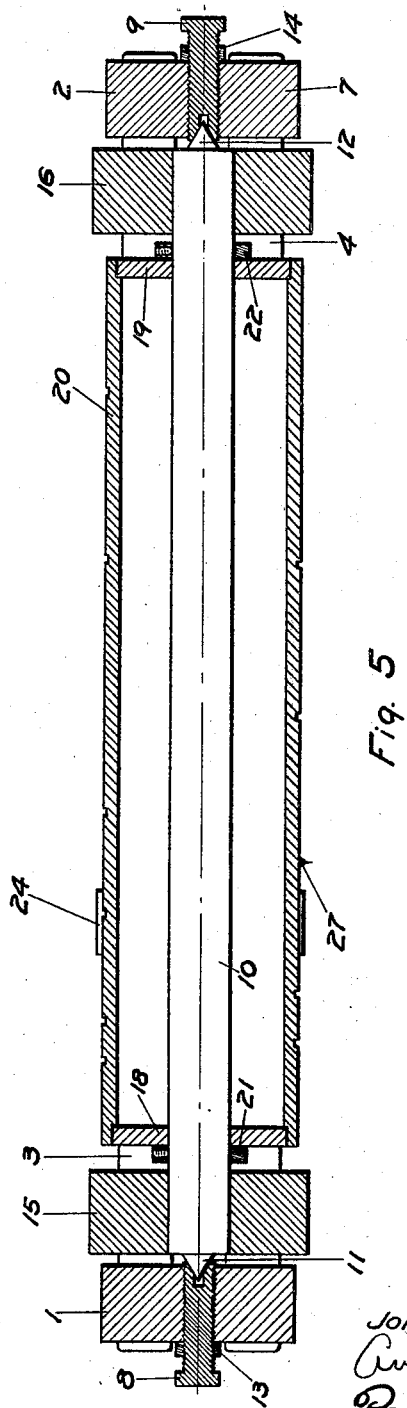
Fig. 5 is a longitudinal section thru the machine along the center of the axle 10.

Referring to Figs. 1 and 5, 1 and 2 are end frames into which are rigidly attached the bars 3, 4, 5 and 6 the whole forming the rigid carriage 7. Pivoted in this carriage by means of the screws 8 and 9 is the axle 10 which is provided with the points 11 and 12 which bear in the conical holes in the screws 8 and 9 as shown in Fig. 5. These screws are provided with lock nuts 13 and 14.

Rigidly attached to the axle 10 are the two knurled wheels 15 and 16 on which the carriage 7 rides and by which it is constrained to run parallel to the axle 10. The wheel 17 is provided to balance the carriage 7.

Pivoted on the axle 10, by means of the disks 18 and 19, is the drum 20 which is rigidly attached to the said disks. Motion along the axle 10 is prevented by the collars 21 and 22 which are attached to the said axle by means of set screws.

Riding on the bars 3, 4, 5 and 6 are the carriages 23 and 24, of which 23 is provided with the pointer 25 and a carriage grip 26 for operating the device, and 24 is provided with the pencil 27.

In order to eliminate friction, these carriages are provided with various rollers 28, 29, 30, 31 and 32 as shown, and some of these rollers are adjustable so as to take up the play between said rollers and the bars on which they ride.

The carriages 23 and 24 are also provided with pins 33 and 34 respectively, which engage grooves on the drum 20 as will be described later.

On the face of the drum 20 are cut the grooves 35, 36 and 37 as shown, developed diagrammatically, in Fig. 2. The curve 35 is a helix and this is engaged by the pin 33. The curve 36 is equal to $\frac{x^3}{30}$ and the curve 37 is equal to $\frac{x^3}{60}$, either of which may engage the pin 34 as will be explained later.

The pins 33 and 34 are placed on diametrically opposite sides of the drum 20 and the helix 35 is so placed relative to the curves 36 and 37 that the pin 33 engages the helix 35 on one side of the drum 20 while the pin 34 is engaged by whichever of the curves 36 or 37 it is desired to use on the other side.

It will be noted that if the carriage 23 is moved parallel to the axis of the drum 20 the pin 33 riding in the helix 35 will cause said drum to revolve and the curve 36 (or 37) by engaging the pin 34 will cause the carriage 24 to move in a direction parallel to the axis of the drum a distance equal to $\frac{x^3}{30}$ $\left(\text{or } \frac{x^3}{60}\right)$ where $x$ is the distance traveled by the carriage 23.

If the carriage 23 is moved at right angles to the axis of the drum 20 the device as a whole moves with it, the said drum does not revolve and the distance traveled by the pencil 27 is equal to the distance traveled by the pointer 25.

The moments of inertia of a rectangular area about an axis drawn thru its base is equal to $\frac{bd^3}{3}$, where $b$ is its breadth and $d$ is the distance from the said axis to the upper edge. Irregular areas may be divided into a large number of rectangles similar to the above and the sum of the moments of inertia of these areas is equal to the moment of inertia of the area in question.

From the above, it will be seen that if the area be traced with the tracer point, the pencil 27 will trace a figure the area of which (as determined by a planimeter or otherwise) multiplied by ten if the curve $\frac{x^3}{30}$ is used, or by twenty if the curve $\frac{x^3}{60}$ is used, will be equal to the moment of inertia of the given area about the given axis.

This area may be determined independently (by planimeter or otherwise) if it has been drawn by the pencil 27 or, if a planimeter tracer point is pivotally attached to the pencil carriage 24, the area of this figure may be determined at the same time that it is being drawn.

The two curves 36 and 37 are provided to insure greater accuracy for calculating a greater range of areas than could be determined if only one curve were provided. The curve 37 is for use when moments of inertia of large areas are to be determined and the curve 36 is for small areas.

We have shown the machine as made with a drum 20 which is rotated by the motion of the carriage 23 and which drives the carriage 24 but the same result can be obtained by using a disc instead of the drum and we therefore do not wish to limit ourselves to the construction shown herein as we believe that the idea of obtaining graphically by mechanical means the relation between an area and its moment of inertia is new.

We are aware that prior to this invention machines for calculating moments of inertia have been made which represent the moment of inertia graphically. We therefore do not claim such a device broadly; but

We claim:

1. In combination, a main carriage provided with means for rolling in a direction at right angles to its axis while remaining parallel to it, a drum pivoted in this main carriage with its axis parallel to the axis of said carriage but capable of rotating independently of the motion of said carriage, a helical groove cut into the face of said drum, a small carriage capable of moving freely on the main carriage in a direction parallel to the axis of said drum, a pin attached to said small carriage and engaging the helical groove in said drum in such a manner that motion of the small carriage rotates the said drum thru the medium of the said pin, a pointer attached to said small carriage for tracing over areas of which the moment of inertia is to be determined, a second small carriage also capable of moving on the main carriage parallel to the axis of said drum, a second pin attached to said second small carriage which engages a second curved groove cut into said drum (the equation of said curved groove being $\frac{x^3}{30}$ the second small carriage being driven proportionately to $\frac{x^3}{30}$ by the motion of said drum thru the medium of the second pin and means for recording the motion of said second small carriage.

2. The combination of means for tracing around an area, the moment of inertia of which is to be determined; a member capable of being operated by said tracing means and a drawing member capable of being driven by the tracing means thru the medium of said first named member to cause the second named member to move in such a way that its ordinates are proportional to the cube of the ordinates of the movement of said tracing means.

3. In combination, a tracer point, a pencil and means including a drum on which are cut suitable curved grooves whereby the motion of said tracer point causes the said pencil to draw an area proportionate to the moment of inertia of the area traced by said tracer point.

4. In combination, a tracer point, a carriage carrying said tracer point, a pin carried by said carriage, a rotatable cylinder in the face of which a helical groove is cut which is engaged by said pin and by which said cylinder may be rotated, a groove whose equation is that of a cubical curve cut into the said cylinder similarly to the helix, a second pin engaging said groove whose equation is that of a cubical curve, a second carriage carrying said second pin and thru which said second carriage is moved according to the cubical curve when said drum is rotated by the motion of said first carriage, a pencil for recording the motion of said second carriage and means for carrying all the above mentioned parts and allowing them to roll as a whole in a direction perpendicular to the axis of said drum and of the motion of said carriages.

5. In a device for calculating the moment of inertia of an area, a point, a tracer and a movable member provided with means which cooperate with said point and said tracer whereby the ordinate drawn by the point and the tracer are in the relation of $y : \frac{Y^3}{C}$ and the abscissæ are equal.

6. Means for calculating the moment of inertia comprising tracing means, drawing means and means intermediate said tracing and drawing means whereby movement of said tracing means in a given direction causes said drawing means to move proportionately to the cube of the movement of said tracing means.

ANDRÉ KORONSKI.
RALPH H. HEACOCK.